United States Patent
Bright et al.

(10) Patent No.: US 10,770,901 B2
(45) Date of Patent: Sep. 8, 2020

(54) SYSTEMS AND METHODS FOR OPTIMALLY DELIVERING ELECTRICAL ENERGY IN A NETWORK

(71) Applicant: Nexant, Inc., San Francisco, CA (US)

(72) Inventors: Joseph M. Bright, Mesa, AZ (US); Mauro Prais, Tempe, AZ (US)

(73) Assignee: Nexant, Inc., San Francisco, CA (US)

( * ) Notice: Subject to any disclaimer, the term of this patent is extended or adjusted under 35 U.S.C. 154(b) by 187 days.

(21) Appl. No.: 15/946,605

(22) Filed: Apr. 5, 2018

(65) Prior Publication Data

US 2018/0294649 A1 Oct. 11, 2018

Related U.S. Application Data

(60) Provisional application No. 62/482,883, filed on Apr. 7, 2017, provisional application No. 62/524,211, filed on Jun. 23, 2017.

(51) Int. Cl.
*H02J 3/38* (2006.01)
*G05B 13/04* (2006.01)

(52) U.S. Cl.
CPC ............ *H02J 3/381* (2013.01); *G05B 13/041* (2013.01); *H02J 3/38* (2013.01); *H02J 2203/20* (2020.01)

(58) Field of Classification Search
CPC ........ H02J 3/381; H02J 3/38; H02J 2003/007; G05B 13/041
USPC ........................................................ 700/287
See application file for complete search history.

(56) References Cited

U.S. PATENT DOCUMENTS

| | | | |
|---|---|---|---|
| 2006/0276938 A1 | 7/2006 | Miller | |
| 2008/0005010 A1* | 1/2008 | Alvarado | G06Q 30/0206 705/36 R |
| 2011/0231028 A1 | 9/2011 | Ozog | |
| 2012/0173146 A1* | 7/2012 | Mohr | G01W 1/00 702/3 |
| 2012/0179301 A1 | 12/2012 | Aivaliotis et al. | |
| 2013/0018517 A1* | 1/2013 | Kalagnanam | G06Q 50/06 700/291 |
| 2013/0190938 A1 | 7/2013 | Zadeh et al. | |
| 2014/0049109 A1 | 2/2014 | Kerns et al. | |
| 2014/0172503 A1* | 6/2014 | Hammerstrom | G06Q 30/0206 705/7.31 |
| 2015/0039145 A1* | 2/2015 | Yang | G05B 13/02 700/291 |

(Continued)

*Primary Examiner* — James J Lee
*Assistant Examiner* — Michael W Choi
(74) *Attorney, Agent, or Firm* — Haley Guiliano LLP

(57) ABSTRACT

A method for delivering an energy resource on a network includes receiving constraints, a first objective function, and a second objective function. The constraints represent electrical load capacities of elements of the network. The constraints and the first objective function are used to identify (i) a load matrix embodying a set of optimal electrical loads for each of the plurality of elements of the power grid and (ii) a corresponding first feature matrix. The load matrix and the first feature matrix optimize the first objective function and satisfy the constraints. If the load matrix and first feature matrix indicate a non-binding fully loaded (NBFL) constraint, the second objective function is used to identify a second feature matrix which optimizes both the first and second objective functions while satisfying the constraints. The second feature matrix assigns a non-zero value to at least one previously identified NBFL constraint.

31 Claims, 8 Drawing Sheets

(56) References Cited

U.S. PATENT DOCUMENTS

2017/0109674 A1\* 4/2017 Parvania .................. G05F 1/66

\* cited by examiner

SYSTEMS AND METHODS FOR OPTIMALLY DELIVERING ELECTRICAL ENERGY IN A NETWORK

CROSS REFERENCE TO RELATED APPLICATIONS

This application claims benefit under 35 U.S.C § 119(e) to U.S. Provisional Application 62/482,883, filed Apr. 7, 2017 and titled "System and Methods to Address Indeterminacy in Network Optimization Processes," which is hereby incorporated by reference in its entirety. This application also claims benefit under 35 U.S.C § 119(e) to U.S. Provisional Application 62/524,211, filed Jun. 23, 2017 and titled "Systems and Methods for Optimally Delivering Electrical Energy in a Network," which is hereby incorporated by reference in its entirety.

FIELD

The systems and methods described herein provide, among other things, an approach to address indeterminacy in optimization for processes of generation and delivery of electrical power. In particular, the systems and methods are described in relation to indeterminacy in value of generated electrical power.

BACKGROUND

Optimization processes are techniques that achieve the best outcome in systems with functional constraints, such as constrained resources and combinations of the competitive resources. Examples of these constraints can include, among others, the power that can be output from a generator and the power that can be transmitted by a transmission line. The best outcome may be defined as the outcome that results in the lowest value of an objective function, which is typically presented mathematically in terms of cost. For example, the lowest value may represent the lowest price paid for generation of electrical power. In another example, the best outcome may be defined as the outcome that results in the highest value of an objective function. For example, the highest value may represent the highest price paid for generation of electrical power. The outcome of such an optimization process is the best schedule of resource values (the optimal point) that satisfy the constraints. For example, the best schedule of resource values may define a power generation schedule for several power generators.

Typically, the optimal point is based upon some important system parameters, such as the value (e.g. price) of the resource or the cost of producing the resource. The optimization process reaches an equilibrium point where the incremental value of each available resource (not on a limit) is equal to the calculated incremental value of the resource given the set functional constraints on limit. This equilibrium point is termed the Karush-Kuhn-Tucker (KKT) condition in mathematics and the Nash equilibrium point in economics. Resources establishing the equilibrium may be called marginal resources.

The calculated measure of value (e.g. price) of each resource at the optimal point is derived from the benefit of relaxing each binding functional constraint. This measure of the value is called the shadow value. In some embodiments, the shadow value may be a shadow price. The Lagrangian multiplier may also be used to represent the worth for purposes of optimization.

In the simplest form of the solution of the optimization process, the functional constraints that are not on limit have no worth (their shadow values are zero) whereas all binding functional constraints on limits have a positive value and thus provide value. The values of the binding functional constraints are used to calculate the replacement value (clearing value) of resources that are fully utilized (above the margin) or completely unutilized (below the margin).

Occasionally the solution of the optimization process results in some non-binding but fully loaded (NBFL) constraints. These are functional constraints that are on limits at the solution but have shadow values of zero. This condition indicates that shadow values are indeterminate as well as the derivative values calculated for resources above or below the margin. The worth of these resources becomes nebulous as their resulting values depend upon the order of the processing of constraints (path-dependency) during the solution.

SUMMARY

Systems, devices, and methods presented herein resolve indeterminacy in optimization processes. These systems, devices, and methods can yield optimization results which are path-independent, (e.g., results which do not depend on the order in which functional constraints are processed). The systems, devices, and methods may include a first optimization process based on a first objective function, and a second optimization process based on a second objective function. The first optimization process identifies a set of optimal resource values (e.g., load values) that optimize the first objective function while also satisfying the constraints of the system being optimized (e.g., a power grid). The second optimization process identifies a set of value (e.g., shadow value, shadow price, or any other suitable measure of worth) that maximizes (or minimizes) the second objective function while also preserving the resource values identified by the first optimization process. The second optimization process may assign non-zero value to non-binding, fully loaded (NBFL) constraints identified in the first optimization process. The values of the NBFL constraints may be determined by the second optimization process, respecting the value boundaries for the fully loaded constraints as well as the clearing value for the non-marginal resources established by the first optimization process. Any function of these NBFL shadow value can be selected as the second objective function if the function allows the second optimization process to produce a unique solution. The result of the second optimization process is a set of consistent value that are no longer path-dependent, but which maintain the resource values found to be optimal in the first optimization process.

The systems and methods described herein can, for example, be used to improve the average clearing value of resources across all periods of a multi-period transmission congestion contract (TCC) auction. A multi-period transmission congestion contract (TCC) auction is an optimization process that allows market participants to obtain a uniform megawatt (MW) value across pre-defined time periods for a single bid. A multi-period TCC bid's clearing value is the sum of the component values in each period. The individual time periods of the multi-period auction are general and may correspond to individual months, different times of use (TOUs), successive months or years, time slots occurring for the applications of planned outages over an auction's life cycle, or combinations the foregoing. Identical or separate network models, lists of outages, or contingency lists can be assigned to the periods.

A simple way to implement a multi-period TCC auction is to only allow bids and offers for all periods together as a bundle, but auctions rarely require all time periods to be purchased together as a bundle. Instead, buyers often choose to purchase only a subset of a time period being offered for sale. For example, a seller may offer TCCs for June through August, but the buyer may only wish to buy a contract for TCCs for the month of July. However, if the models for each period are identical (including, for example, network, constraints and points of injection and withdrawal (POI/POW)), binding constraints appear in only the first period. Constraints in other periods directly corresponding to those binding in the first would be fully loaded, but their shadow values, and consequently the bus values, would be zero in those periods. Thus, only the first period would have any assigned worth.

The system and methods described herein have been developed to determine an optimal set of constraint shadow values (e.g., optimal values or optimal prices with respect to a second objective function). One example of the second objective function improves the bus, POI/POW or TCC average clearing values across all periods. Another example of the second objective function optimizes the revenue from a TCC auction. The solution of the second objective function does not compromise the optimality of the optimized resource values (e.g., optimality with respect to a first objective function). The method is general for any configuration of bids and offers specified in one or more or all periods and for any differences in models across the individual periods.

In one aspect, a method for optimally delivering electrical energy includes receiving a first objective function and a second objective function for optimizing delivery of an energy resource over a power grid; receiving a set of constraints representing electrical load capacities of a plurality of elements of the power grid; executing a first optimization process, using the set of constraints and the first objective function, to identify (i) a load matrix embodying a set of optimal electrical loads for each of the plurality of elements of the power grid and (ii) a first feature matrix representing values corresponding to the optimal electrical loads (for example the first feature matrix may represent prices corresponding to the optimal electrical loads), the load matrix and first feature matrix optimizing the first objective function and satisfying the set of constraints; determining that one or more of the elements of the plurality of elements is fully loaded if the optimal load of the respective one or more elements is equal to the electrical load capacity of the respective one or more elements; determining that one or more of the elements of the plurality of elements is non-binding if the value corresponding to the respective one or more elements is zero; if the load matrix does not include an element that is both non-binding and fully loaded: outputting the first load matrix and the first feature matrix; and if the load matrix includes an element that is both non-binding and fully loaded: performing a second optimization process, using the first feature matrix and the second objective function as inputs, to identify a second feature matrix which optimizes the second objective function (for example the second feature matrix may indicated optimized prices under the second objective function), the second feature matrix preserving the optimality of the first objective function and satisfying the set of constraints, the second feature matrix assigning a non-zero value to the element that was determined to be non-binding and fully-loaded; and outputting the first load matrix and the second feature matrix.

In some implementations, the elements of the power grid include at least one of an electrical conduit and a power generator. In certain implementations, the electrical load capacity is a maximum current which the electrical conduit can transmit without exceeding 100° C. In some implementations, the electrical load capacity is determined by at least one of IEEE Standard 738, CIGRE TB 207, and EPRI Dynamp. In certain implementations, the second objective function is a function of shadow values of non-binding fully loaded constraints of the power grid. In some implementations, the second objective function is a measure of disparity in values of the energy resources. In certain implementations, the second objective function is based on a sum of squares of differences between an average value and each value in the second feature matrix.

In some implementations, the second objective function is $$\sum_{m=1}^{Periods} \sum_{i=1}^{Buses} (P_{i,m}(\underline{\alpha}) - \overline{P}_i(\underline{\alpha}))^2$$

where α's are shadow values of non-binding fully loaded (NBFL) constraints, $\underline{\alpha}$ is a matrix of the α's, $P_{i,m}$ is a clearing value of an $i^{th}$ bus in a period m, $\overline{P}_i$ is the average clearing value of the $i^{th}$ bus across all periods.

In certain implementations, the second objective function is $$\sum_{i=1}^{N TCCs} TCC_i \times CP_i$$

where N TCCs is a number of TCCs, $TCC_i$ is energy awarded by the $i^{th}$ TCC, and $CP_i$ is a clearing value of the energy awarded to the $i^{th}$ TCC.

In some implementations, the second objective function is $$\sum_{i=1}^{N TCC CF} TCC_i \times CP_i$$

where N TCC CF is a number of counterflow TCCs, $TCC_i$ is energy awarded by the $i^{th}$ TCC, and $CP_i$ is a clearing value of the energy awarded to the $i^{th}$ TCC.

In certain implementations, the second objective function is $$\sum_{i=1}^{NGen} MW_i \times LMP_i$$

where NGen is a number of power generators, $MW_i$ is the amount of power supplied from the $i^{th}$ generator, and $LMP_i$ is a locational based marginal value of the power from the $i^{th}$ generator.

In some implementations, the second objective function is $$\sum_{i=1}^{N\ Consumers} MW_i \times LMP_i$$

where NConsumers is a number of consumers, $MW_i$ is an amount of power consumed by the $i^{th}$ consumer, and $LMP_i$ is a locational based marginal value of power consumed by the $i^{th}$ consumer.

In certain implementations, the second objective function is $$\sum_{i=1}^{N\ Virtual} MW_i \times LMP_i$$

where NVirtual is a number of virtual bidders, $MW_i$ is an amount of power bought or sold by the $i^{th}$ virtual bidder, and $LMP_i$ is a locational based marginal value of the power bought or sold by the $i^{th}$ virtual bidder.

In some implementations, the second objective function is $$\left( \sum_{i=1}^{N\ Consumers} MW_i \times LMP_i - \sum_{i=1}^{NGen} MW_j \times LMP_j \right)$$

where NConsumers is a number of consumers, $MW_i$ is an amount of power consumed by the $i^{th}$ consumer, and $LMP_i$ is the locational based marginal value of the power consumed by the $i^{th}$ consumer, NGen is the number of power generators, $MW_j$ is the amount of power supplied from the $j^{th}$ generator, and $LMP_j$ is a locational based marginal value of the power from the $j^{th}$ generator.

In certain implementations, the second optimization process receives optimality-preserving value ranges from the first optimization process. In some implementations, the second optimization is performed using at least one of linear programming and quadratic programming. In certain implementations, the second optimization is performed using interior-point methods. In some implementations, the second optimization is performed using at least one of an ellipsoid algorithm, a Karmarkar's projective algorithm, affine scaling, barrier function algorithm, and a path-following algorithm. In certain implementations, the second optimization is performed using at least one of a Lagrangian multiplier, an active set algorithm, an augmented Lagrangian algorithm, a conjugate gradient algorithm, and a gradient projection algorithm.

In some implementations, the energy resource is at least one of electrical energy and a derivative right in electrical energy. In certain implementations, optimizing the first objective function includes one of minimizing the second objective function and maximizing the first objective function. In some implementations, optimizing the second objective function includes one of minimizing the second objective function and maximizing the second objective function.

In another aspect, a system for delivering an energy resource includes a user interface, a processor, and non-transitory, computer-readable memory. The user interface is configured to receive: a first objective function for optimizing distribution of an energy resource, wherein the energy resource is at least one of electrical energy and a derivative right in electrical energy; a set of constraints including a representation of electrical load capacities of a plurality of elements of a power grid; and a second objective function for assigning value (e.g., price) to the energy resource. The processor is configured to execute optimization processes. The non-transitory, computer-readable memory stores instructions which, when executed by the processor, cause the processor to identify, using the set of constraints and the first objective function, both (i) a load matrix embodying a delivery of the energy resource over the power grid, and (ii) a first feature matrix representing values corresponding to the load matrix, each of which optimize the first objective function while satisfying the set of constraints; determine whether the load matrix indicates that at least one element of the plurality of elements is fully loaded; determine whether the first feature matrix includes a zero-value corresponding to a fully loaded element; and, if the first feature matrix includes a zero-value corresponding to a fully loaded element, identify, using the first feature matrix and the second objective function, a second feature matrix which optimizes the second objective function and which represents values corresponding to the load matrix, the second feature matrix preserving the optimization of the first objective function and satisfying the set of constraints, the second feature matrix not equaling the first feature matrix.

In some implementations, the system further includes the power grid. In certain implementations, the elements of the power grid include at least one of an electrical conduit and a power generator. In some implementations, the electrical load capacity is a maximum current which the electrical conduit can transmit without exceeding 100° C. In certain implementations, the second objective function is a measure of disparity in values of the energy resources.

In some implementations, the second objective function is $$\sum_{m=1}^{Periods} \sum_{i=1}^{nb} (P_{i,m}(\underline{\alpha}) - \overline{P}_i(\underline{\alpha}))^2$$

where nb is a number of buses in the power grid, Periods is a number of periods, $P_{i,m}$ is a value of the $i^{th}$ bus in the $m^{th}$ period, $\underline{\alpha}$ is a matrix of shadow values of non-binding fully loaded constraints of the power grid, and $\overline{P}_i$ is the average value. In certain implementations, second optimization is performed using interior-point methods.

Various changes and modifications to the embodiments herein chosen for purposes of illustration will readily occur to those skilled in the art. For example, although the disclosure discusses two optimization processes, in some implementations the first optimization process and the second optimization process may be combined into a single process. Additionally, although the disclosure discusses multi-period auctions, the systems and methods disclosed herein are not limited to multi-period auctions. Also, although this disclosure discusses optimization processes that maximize objective functions, the skilled person will appreciate that optimization processes may also minimize an objective function or the absolute value of an objective function. Additionally, although the present disclosure focuses on the delivery and assigning value to an energy resource (e.g., electrical energy, congestion rights, transmission rights, and/or any other energy derivative right), the skilled artisan will appreciate that the systems, devices, and methods described herein can be adapted and modified for other suitable applications, such as delivering non-energy utilities (e.g., water, oil, gas, steam, heat, or other utilities), commodities, commodity futures, and other derivative rights. Energy derivative rights include contracts (e.g. derivatives) between two or more parties whose value is based on an agreed-upon underlying commodity, or asset, related to energy. Energy derivative rights include as transmission congestion contracts (TCCs). To such extent that such modifications and variations do not depart from the spirit of the invention, they are intended to be included within the scope thereof.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION OF THE FIGURES

To provide an overall understanding of the systems, devices, and methods disclosed herein, certain illustrative embodiments will now be described, including a process that optimizes the delivery and assigning value to an energy resource (e.g., assigning a price to electrical energy, congestion rights, transmission rights, and/or any other energy derivative right). However, it will be understood by one of ordinary skill in the art that the systems, devices, and methods described herein can be adapted and modified for other suitable applications, such as delivering non-energy utilities (e.g., water, oil, gas, steam, heat, or other utilities), commodities, commodity futures, and other derivative rights. Such modifications will not depart from the scope of this disclosure.

Systems, devices, and methods presented herein resolve indeterminacy in optimization processes. These systems, devices, and methods can yield optimization results which are path-independent, (e.g., results which do not depend on the order in which functional constraints are processed). The systems, devices, and methods may include a first optimization process based on a first objective function, and a second optimization process based on a second objective function. The first optimization process identifies a set of optimal resource values (e.g., load values) that optimize the first objective function while also satisfying the constraints of the system being optimized (e.g., a power grid). The second optimization process identifies a set of values (e.g., shadow values or any other suitable measure of worth) that maximizes (or minimizes) the second objective function while also preserving the resource values identified by the first optimization process. For simplicity, the phrase "optimizing" an objective function will be used herein to mean maximizing or minimizing the value of the objective function. The second optimization process may assign non-zero values to non-binding, fully loaded (NBFL) constraints identified in the first optimization process. The values of the NBFL constraints may be determined by the second optimization process, respecting the value boundaries for the fully loaded constraints as well as the clearing values for the non-marginal resources established by the first optimization process. Any function of these NBFL shadow values can be selected as the second objective function if the function allows the second optimization process to produce a unique solution. The result of the second optimization process is a set of consistent values that are no longer path-dependent, but which maintain the resource values found to be optimal in the first optimization process.

Figure 1:
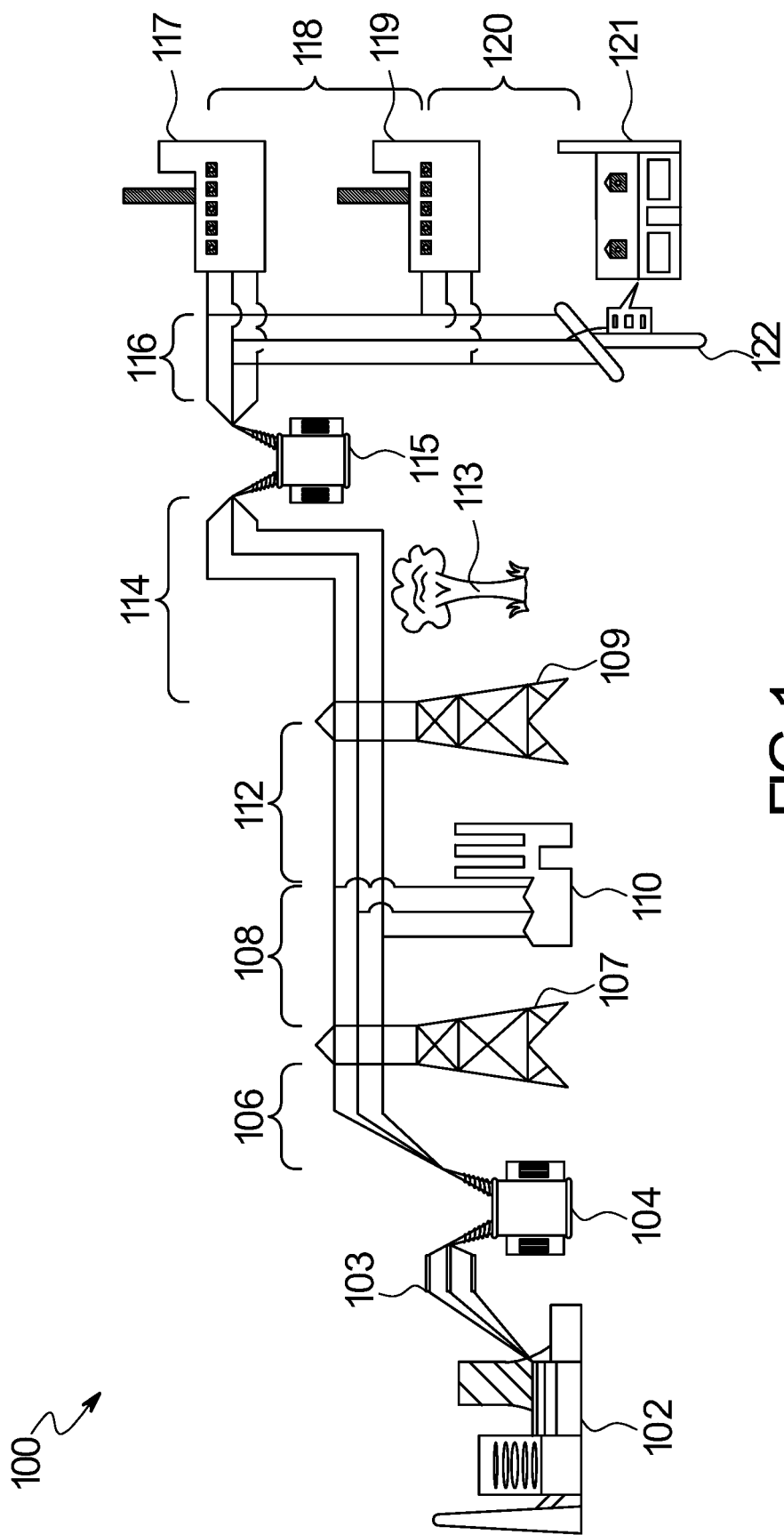
FIG. 1 shows a power grid in which a network optimization process operates.

FIG. 1 depicts an illustrative power grid 100 in which the systems, devices, and methods disclosed herein may operate. The power grid 100 includes a generating station 102; transmission line 103; generating step-up transformer 104; transmission lines 106, 108, 112, and 114; transmission towers 107 and 109; transmission substation 110; step-down transformer 115; distribution lines 116, 118, and 120; distribution tower 122; industrial consumers 117 and 119; and residential consumer 121.

Energy is generated by the generating station 102. The generating station 102 may generate electrical energy using coal, oil, natural gas, other fossil fuels, nuclear reactions, hydroelectric generation, solar energy, geothermal energy, wind turbines, or any other suitable method of power generation. The power generated by the generating station 102 may have an alternating current (e.g., 60 Hz) and a high voltage (e.g., >1 kV, >5 kV, >10 kV, >20 kV). The power generated by the generating station 102 may have three phases and may be carried on three separate lines. The generating station 102 may be considered a point of injection (POI) for the power grid 100.

The generating station 102 transmits power to the step-up transformer 104 through the transmission line 103. The step-up transformer 104 increases the voltage of the transmitted power. The step-up transformer 104 may output a voltage of 100 kV to 800 kV (e.g., 115 kV, 138 kV, 230 kV, 345 kV, 500 kV, 765 kV). The high voltage achieved by the step-up transformer 104 reduces power losses during long-range (e.g., >1 mile, >10 miles, >100 miles) power transmission. This is because a lower current can be used to transmit power when the voltage is high, and resistive losses are proportional to current. The high-voltage power is carried from the step-up transformer 104 to the transmission substation 110 via the transmission lines 106 and 108. The transmission lines 106 and 108 are supported by the transmission tower 107.

The transmission substation 110 transmits power to the industrial consumers 117 and 19 and the residential consumer 121. The industrial consumers 117 and 19 and the residential consumer 121 are points of withdrawal (POW) of the power grid 101. The transmission substation 110 can manage transmission congestion using market mechanisms, monitor the energy market (e.g., amount of power demanded by and/or supplied to consumers), reroute power transmissions, identify market abuses, and impose fees for power transmissions.

The transmission substation 110 may be controlled by an entity different from the entity that controls the generating station 102. For example, the transmission substation 110 may be operated, or controlled by an independent system operator (ISO). An ISO operates an electric grid for a region or state and administers the region's wholesale electricity markets. An ISO may be a neutral party responsible for the management and control of the electric transmission grid of a state. The ISO receives bids to purchase energy from load serving entities (LSE) and receives offers to sell energy from power suppliers or generators (Gen). The ISO may use locational based marginal assignment of value, which sets the value of power (e.g. the price to generate electrical power) at a location on the grid equal to the cost of supplying the next increment (e.g., 1 MW) of power to that specific location. In some embodiments, the ISO may use locational based marginal pricing (LBMP) to set the value (e.g., price) of power. The locational based marginal value may also be called the clearing value. In certain implementations the transmission substation 110 is controlled by a regional transmission organization (RTO), the same entity that controls the generating station 102, or any other suitable entity.

Power leaving the transmission substation 110 travels over the transmission lines 112 and 114 to the step-down transformer 115. The transmission lines 112 and 114 are supported by the transmission tower 109. The maximum power or current that can be transmitted through the transmission lines 112 and 114 is limited. For example, the transmission lines 112 and 114 may have a maximum safe operating temperature which defines the maximum amount of power that the transmission lines 112 and 114 can carry. In certain implementations, the maximum steady-state operating temperature of the transmission lines 112 and 114 is 50° C., 100° C., or 150° C. The maximum amount of current a transmission line can carry is its "ampacity" or "line rating." Line ratings can be calculated using heat balance approaches, including IEEE Standard 738, CIGRE TB 207, and EPRI Dynamp.

In addition to simple thermal constraints, the ampacity of the transmission lines 112 and 114 may be limited by sag constraints. Although not shown in FIG. 1, overhead transmission lines sag under their own weight, forming catenary curves. If the transmission lines 112 and 114 are heated by power transmission (e.g., due to resistive losses), the transmission lines 112 and 114 will undergo thermal expansion, increasing their sag. Sag can be calculated using the ALCOA SAG-10™ algorithm, or any other suitable method. If sag is excessive, the transmission lines may contact trees (e.g., tree 113), posing a fire risk. The upper limit on power transmission due to sag may be lower than the upper limit imposed by the standard maximum operating temperature. The allowable sag of a transmission line may be <5 m, <3 m, <1 m, or any other suitable distance, depending on the environmental conditions.

The step-down transformer 115 receives power from the transmission line 114 and lowers the voltage before passing the power to the downstream power distribution system defined by the distribution lines 116, 118, and 120. The step-down transformer 115 may reduce the voltage to 69 kV, 26 kV, 13 kV, 4 kV, 240 V, 120 V, or any other suitable voltage. Although only one step-down transformer 115 is depicted in FIG. 1 for clarity, multiple step-down transformers are often used throughout the distribution system. For example, the distribution tower 122 may include another transformer to lower voltage to 120 V for residential consumers. The step-down transformer 115 separates the power transmission component of the power grid 100 from the power distribution component of the power grid 100. Power distribution occurs at lower voltages than power transmission because lower voltages can be safer near consumers, because consumers will ultimately need lower voltages than what is used during the transmission phase, and distribution lines are shorter in length so that more resistive losses can be tolerated per unit length in distribution lines than in transmission lines.

Each of the power consumers 117, 119, and 121 are billed for their use of power. The billing may be performed in part by the operator of the transmission substation 110. The value provided (e.g., price paid) by each consumer is based on the power consumed, the time when the power was consumed, and the transmission path through which the power was transmitted. Consumers may be charged a transmission usage charge (TUC), which is the cost of moving power from a POI to the POW. Consumers may be charged more when the power has to be carried a longer distance (e.g., distance from POI to POW) or when power demand is high.

Figure 2:
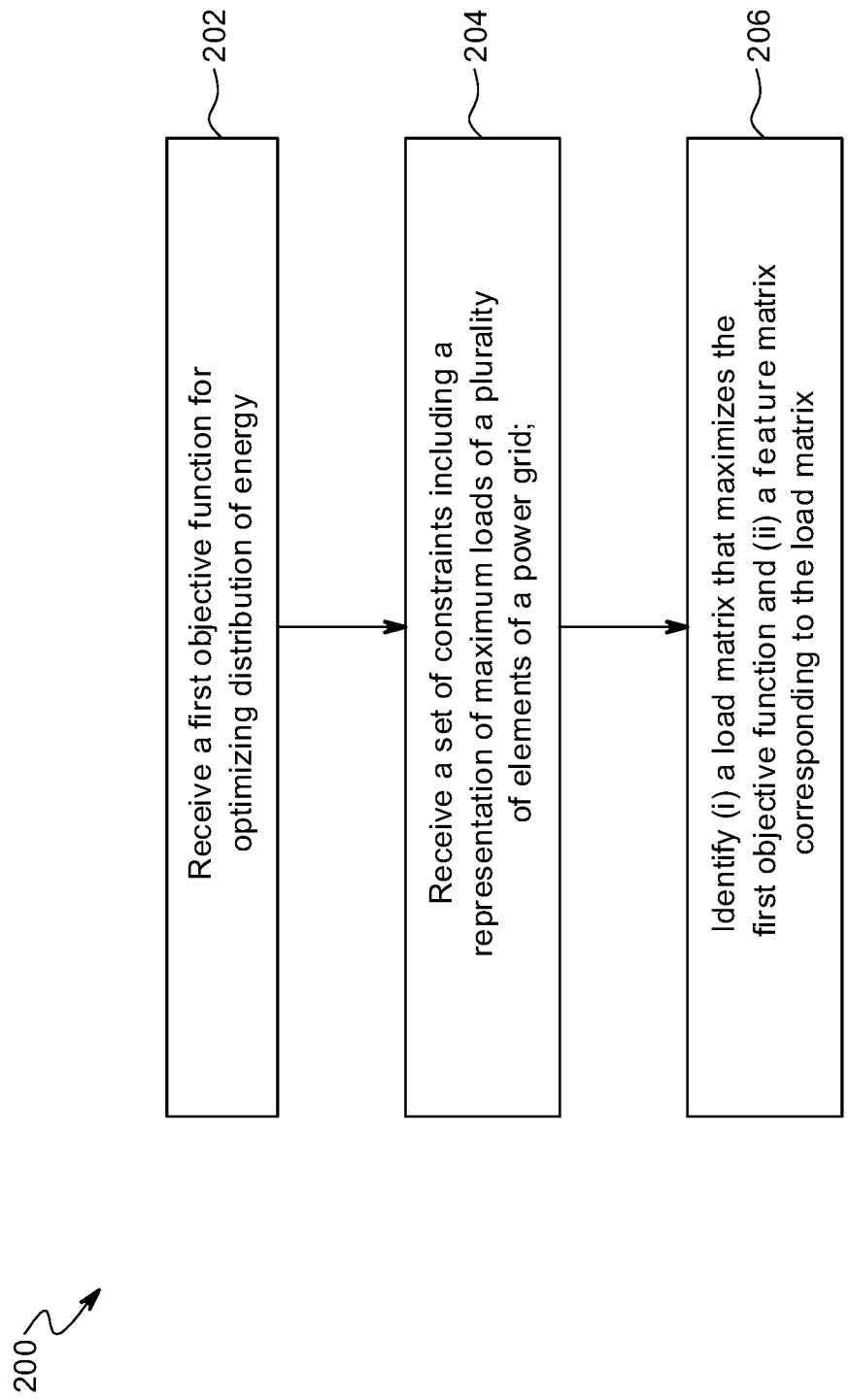
FIG. 2 shows a prior art process for network optimization.

FIG. 2 shows a prior art method 200 for optimizing the distribution of energy on the power grid 100. In step 202, a first objective function for optimizing the distribution of energy is received. The objective function is the function which is to be maximized (or minimized) by the optimization process.

In step 204, a set of constraints is received. The constraints include a representation of the maximum loads of a plurality of elements in the power grid. These constraints may include line ratings of transmission lines.

In step 206, the objective function and the set of constraints is used to identify a load matrix that optimizes the first objective function (while satisfying the constraints) and a feature matrix corresponding to the load matrix. The feature matrix determines the transmission values (e.g., prices) that the power consumers (e.g., consumers 116, 118, and 120) will be billed.

Figure 3:
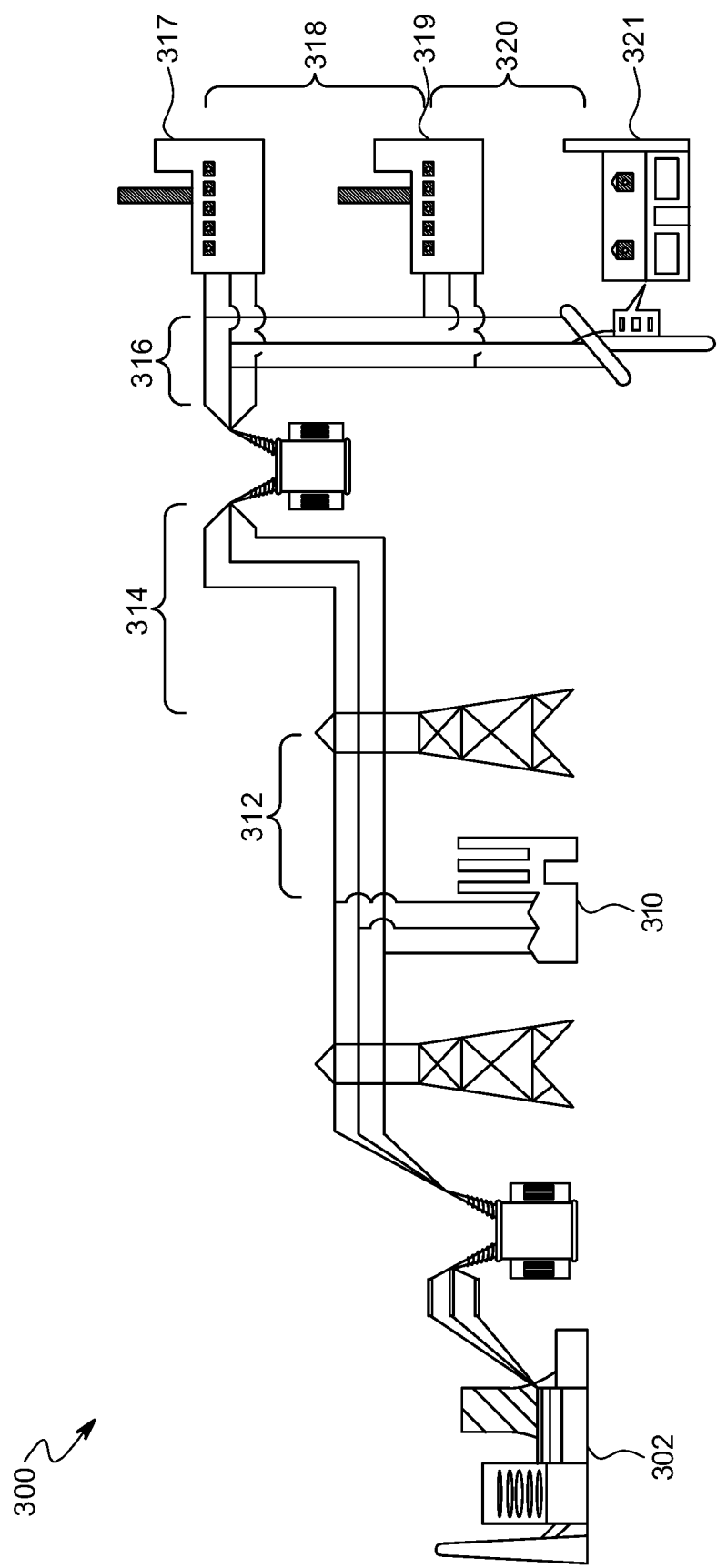
FIG. 3 shows an example power grid after the prior art process for network optimization is performed.

FIG. 3 shows a power grid 300 similar to the power grid 100 of FIG. 1, but with values assigned to some of the power lines. The power grid 300 includes a generating station 302; a transmission substation 310; transmission lines 312 and 314; distribution lines 316, 318, and 320; and consumers 317, 319, and 321. Lines 312, 314, 316, 318, and 320 have each been assigned a load (Amperes) and a value (e.g., cents per kilowatt) that optimizes an objective function. For example, the currents and values may have been determined by the process 200 of FIG. 2.

The currents assigned in FIG. 3 represent the results of an optimization using an objective function. Although the set of assigned currents and values achieve the maximum value of the objective function, the assigned currents and values are not a unique optimal solution. The maximum objective function can also be achieved through at least one other set of loads and values. This means that the optimization problem is degenerate or indeterminate. The conventional optimization methods for the power grid select one of the optimal solutions arbitrarily when there is no unique solution. For example, if Dantzig's simplex algorithm is used for optimization, an arbitrary solution may be selected using Bland's rule. If a solution is not selected arbitrarily, the process 200 may loop indefinitely. The values generated by this process depend upon the order of the processing of constraints during the solution and are therefore path-dependent. This causes the worth of the energy resources to be nebulous.

Figure 4:
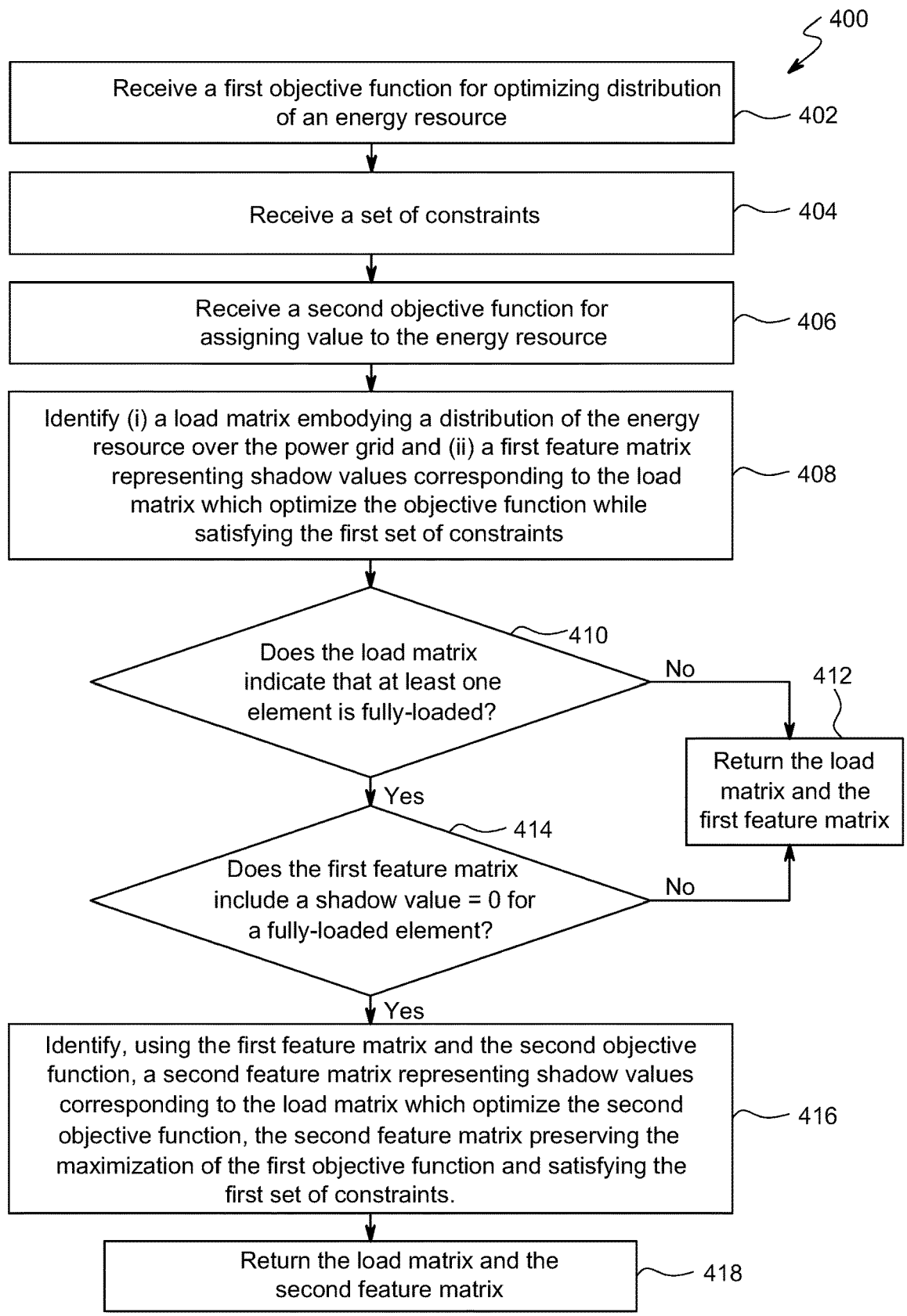
FIG. 4 shows a process for network optimization according to certain implementations.

FIG. 4 shows a two-part process 400 for optimizing the delivery of an energy resource according to certain implementations. The process 400 can avoid the need to generate arbitrary solutions when more than one solution optimizes the objective function, thereby yielding path-independent results (e.g., results which do not depend on the order in which functional constraints are processed). The process 400 includes a first optimization process (step 408) based on a first objective function, and a second optimization process (step 416) based on a second objective function. The first optimization process identifies a set of optimal resource values (e.g., load values) that optimize the first objective function while also satisfying the constraints of the system being optimized (e.g., a power grid). The second optimization process identifies a set of values (e.g., shadow values or any other suitable measure of worth) that maximizes (or minimizes) the second objective function while also preserving the resource values identified by the first optimization process. The second optimization process assigns a non-zero value to at least one non-binding, fully loaded (NBFL) constraint identified in the first optimization process. The result of the second optimization process is a set of less variable values that preserve the optimality achieved by the first optimization process.

In step 402, a first objective function is received for optimizing the delivery of an energy resource. The energy resource may be power, transmission congestion contract (TCC) rights, transmission rights, day-ahead market rights, and/or any other energy derivative. The objective function is maximized (or minimized) by the optimization process 400. The objective function may represent the cost of delivering power, the total quantity of power delivered, revenue for the generating station, revenue for the transmission substation, or any other suitable function. The first objective function may be expressed as:

$$O_1(x,P),$$

which is a function of loads, x, and bid values, P. Although omitted from this expression of $O_1$, the objective function can also depend on the power demanded by the consumers. The loads and values may be expressed in matrix form, such as:

$$x = \begin{bmatrix} x_1 \\ x_2 \\ x_3 \\ \vdots \end{bmatrix} \text{ and } P = \begin{bmatrix} P_1 \\ P_2 \\ P_3 \\ \vdots \end{bmatrix}$$

The index of the load and value variables may correspond to the index of functional constraints or the index of network elements (e.g., buses) such that $x_i$ is the load of constraint (or element) i, and $P_i$ is the value (e.g., shadow value) associated with that constraint (or element) i.

In step 404, a set of constraints is received. In some implementations, the constraints include representations of maximum loads of a plurality of elements of the power grid. For example, the constraints may represent the line ratings of the transmission lines, or distribution lines, of the power grid. The constraints may also represent the capacity of a generating station. The constraints may be expressed as:

$$x_1 \leq b_1$$
$$x_2 \leq b_2$$
$$x_3 \leq b_3$$
$$\vdots$$

where $b_i$ is the functional constraint (e.g., line rating) of the $i^{th}$ constraint (or element). These constraints can be represented compactly in matrix form as:

$$b = \begin{bmatrix} b_1 \\ b_2 \\ b_3 \\ \vdots \end{bmatrix}$$

In step 406, a second objective function is received for assigning value to the energy resource. The second objective function can be used if there is more than one optimal solution to the first objective function. In some implementations, a second objective function is only received if a non-binding fully loaded constraint is detected, which will be discussed further below in relation to steps 410 and 414.

In step 408, a first optimization process is performed that identifies a load matrix and a corresponding feature matrix (e.g., a price matrix) which embody the delivery of the energy resource which optimizes the first objective function while satisfying the set of constraints. In some implementations, the first optimization process also generates clearing values and the boundaries of the clearing values (for non-marginal resources), and shadow values and the boundaries of the shadow values (for fully loaded constraints). The value boundaries may be values beyond (or beneath) which the optimality of the load matrix (with respect to the first objective function) is compromised. These value boundaries may be inputs of the second optimization process discussed in relation to step 416 below. In some implementations, the optimization of step 408 is achieved using linear programming. In certain implementations, step 408 is performed using quadratic programming. In some implementations, the optimization problem can be expressed mathematically as:

$$\max\{O_1(x,P)|x \leq b\}$$

In certain implementations, the optimization process of step 408 identifies an optimal load matrix, x*, and an optimal feature matrix, P*, which represent a set of optimal loads and values.

To give a numerical example, a power grid network may have the following constraints:

$$b = \begin{bmatrix} 8{,}000\ A \\ 8{,}000\ A \\ 1{,}200\ A \\ 1{,}100\ A \\ 500\ A \\ \vdots \end{bmatrix}$$

In this numerical example, we will also assume that the objective function is the total amount of power transmitted. The results of the first optimization process in this example will be an optimal load matrix x*, and an optimal feature matrix, P*, which together optimize $O_1$. In this example, these optimal values may be:

$$x^* = \begin{bmatrix} 8{,}000\ A \\ 8{,}000\ A \\ 1{,}000\ A \\ 1{,}000\ A \\ 200\ A \\ \vdots \end{bmatrix} \quad P^* = \begin{bmatrix} \$0.06/kW \\ \$0.00/kW \\ \$0.05/kW \\ \$0.05/kW \\ \$0.07/kW \\ \vdots \end{bmatrix}$$

Although these matrices maximize the first objective function, they are not necessarily the only matrices which maximize the first objective function.

In certain implementations, the values in the feature matrix are clearing values. A clearing value is the value of a good at which the quantity supplied is equal to the quantity demanded. The clearing value may be considered the price that is actually charged to a buyer or paid to a seller in a market. In some implementations, the values are shadow values. A shadow value is the marginal change in objective value (e.g., value of $O_1$) per unit of constraint (e.g., Amperes, kW, or other suitable unit) obtained by relaxing the constraint. In other words, the shadow value is the marginal utility of relaxing a constraint, or the marginal cost of tightening a constraint. For example, if a line can only carry 1,000 A, and if carrying one more Ampere (i.e., a total of 1,001 A) would increase the objective function by $1, then the shadow value would have a magnitude of $1/A. In certain implementations, the feature matrix includes a combination of shadow values and clearing values.

In step 410, it is determined whether the load matrix indicates that at least one constraint (e.g., corresponding to a bus, branch, generator, or other network element) is fully loaded. In some implementations, an element (e.g., a transmission line) is fully loaded when it is loaded to its constraint (e.g., it is transmitting a current equal to its ampacity). It can be determined whether an element is fully loaded by comparing its calculated load to its constraint (e.g., its line rating or ampacity). In the numerical example given above, comparing the optimized load matrix, x*, to the constraint matrix, b, reveals that elements 1 and 2 are fully loaded. Element 1 has a calculated load of $x_1=b_1=8,000$ A. Similarly, element 2 has a calculated load of $x_2=b_2=8,000$ A.

In step 414, it is determined whether the first feature matrix includes a zero-value fully loaded constraint. A constraint that is fully loaded and that has a value (e.g., shadow value) equal to zero has a non-binding fully loaded (NBFL) constraint. In the example above, element 2 is fully loaded and is associated with a shadow value of zero ($P_2=0$). Therefore, element 2 has a NBFL constraint. NBFL constraints indicate that optimizing the first objective function did not yield a unique solution. In other words, the presence of a NBFL constraint suggests that there is at least one other feature matrix which also optimizes the objective function. NBFL constraints can appear in a variety of ways. For example, in a multi-period transmission congestion contract (TCC) auction, bids are made to obtain rights for consecutive time periods. If the model of the power-grid is identical in each period (e.g., same network structure, constraints, POI, POW), then binding constraints appear in a first period. Constraints in other periods corresponding to the binding constraints in the first time period would also be fully loaded, but would not appear binding (i.e., the shadow values of the constraints in the future time periods would be zero). This means that the future constraints would be NBFL constraints. This results in the assignment of values to the first-period constraints only, but not the future constraints. NBFL can also occur when two lines are in series and loaded to the same ampacity or when two lines with the same impedance are in parallel. This is because relaxing a constraint on only one of the serial elements (e.g., by increasing its ampacity) would yield no change in the value of the objective function because the loads will not change.

If no NBFL constraint is detected, a unique solution has been found, and the process 400 proceeds to step 412 because it is not necessary to perform a second optimization process. If a NBFL constraint is found, the process 400 proceeds to step 416. In some embodiments, at step 412 any of the load matrix, the first feature matrix, or the combination of the two may be transmitted to at least one power generator (e.g., generating station 102) to instruct the at least one power generator to generate electrical power. In some embodiments, the at least one power generator may generate electrical power such that elements of the power grid experience loads specified by the values of the load matrix. In some embodiments, the at least one power generator may receive value (e.g. payments) specified by the first feature matrix. In step 416, a second optimization process is performed using the second objective function to identify a second feature matrix (e.g., a second price matrix) which optimizes the second objective function while preserving optimality with respect to the first objective function and while satisfying the set of constraints. In other words, the second feature matrix (together with the load matrix) optimizes the first objective function and the second objective function. The second optimization process may use value boundaries determined in the first optimization process (step 408) as constraints. For example, if the first optimization process determines that the value corresponding to a particular NBFL constraint must be between $1/MW and $10/MW to preserve the optimality of the result of the first optimization process (the load matrix), then the second optimization process will only consider values between $1/MW and $10/MW for the particular NBFL constraint. In step 418, the load matrix and the second feature matrix are returned. These matrices can be returned in any suitable format. In some embodiments, any of the load matrix, the second feature matrix, or the combination of the two may be transmitted to at least one power generator (e.g., generating station 102) to instruct the at least one power generator to generate electrical power. In some embodiments, the at least one power generator may generate electrical power such that elements of the power grid experience loads specified by the values of the load matrix. In some embodiments, the at least one power generator may receive value (e.g. payments) specified by the second feature matrix.

The second objective function can allow a unique optimum solution to be identified out of a set of optimum solutions to the first optimization process. This is because in some cases multiple matrices are optimal with respect to the first objective function, but only one of those optimal matrices is optimal with respect to the second objective function. Thus, the second objective function may provide unique solutions in cases where a unique solution did not exist on the basis of the first objective function alone. This can reduce arbitrary variation (e.g., path-dependency) in the values output by the optimization process 400 compared to prior art optimization processes. Reducing arbitrariness can result in path-independent assignment of value. This can increase repeatability, uniformity, reliability, and perceived fairness of the values. The second optimization process also allows an administrator of the network to choose rationally among solutions that are equally optimal with respect to the first objective function in a way that advances a second objective. In other words, the second objective function allows a user to specify the criterion by which value indeterminacy is resolved. For example, if multiple outputs provide optimal revenue, then the operator may select the feature matrix that has the least value variability or the lowest average value using the second objective function. To give another example, a user could choose to minimize the remuneration to resources using the second objective function without impacting the optimality with respect to the first objective function.

In some implementations, the decision variables of the second optimization are the values of the shadow values of the NBFL constraints from the first optimization process. In certain implementations, the second objective function is a function of some or all of the values in the first feature matrix. In some implementations, the second optimization only considers the values of those elements which have NBFL constraints. In certain implementations, the second objective function is a measure of value variation, such that the second feature matrix minimizes value variation. For example, the second objective function may be of the form:

$$O_2(P) = \sum_{m=1}^{np} \sum_{i=1}^{n} (P_{i,m} - \overline{P}_i)^2, \text{ where } \overline{P}_i = \left(\frac{1}{np}\sum_{m=1}^{np} P_{i,m}\right),$$

and n is the number of network elements (e.g., buses, POI/POW or multi-period TCCs) and np is the number of periods.

The second optimization process of step 416 returns a second feature matrix, P*'. The load matrix corresponding to the second feature matrix is still x* because the load matrix is unchanged by the second optimization process of step 416. The second feature matrix preserves optimality with respect to the first objective function. Therefore:

$$O_1(x^*,P^{*'}) = O_1(x^*,P^*)$$

However, the value of the second objective function of the second feature matrix is greater than or equal to the value of the second objective function of the first feature matrix:

$$O_2(P^{*'}) \geq O_2(P^*)$$

Continuing the numerical example given above, the second feature matrix identified by the second optimization process may be:

$$P^{*'} = \begin{bmatrix} \$0.03/kW \\ \$0.03/kW \\ \$0.05/kW \\ \$0.05/kW \\ \$0.07/kW \\ \vdots \end{bmatrix}$$

The load matrix corresponding to this feature matrix would be the same load matrix, x*, as identified by the first optimization process:

$$x^* = \begin{bmatrix} 8,000\ A \\ 8,000\ A \\ 1,000\ A \\ 1,000\ A \\ 200\ A \\ \vdots \end{bmatrix}$$

The second feature matrix has no zero-value constraints. In this example, the second feature matrix has less value variability than the first feature matrix. The reduced value variability may be more desirable because it can result in more predictable, more consistent assignments of value.

Figure 5:
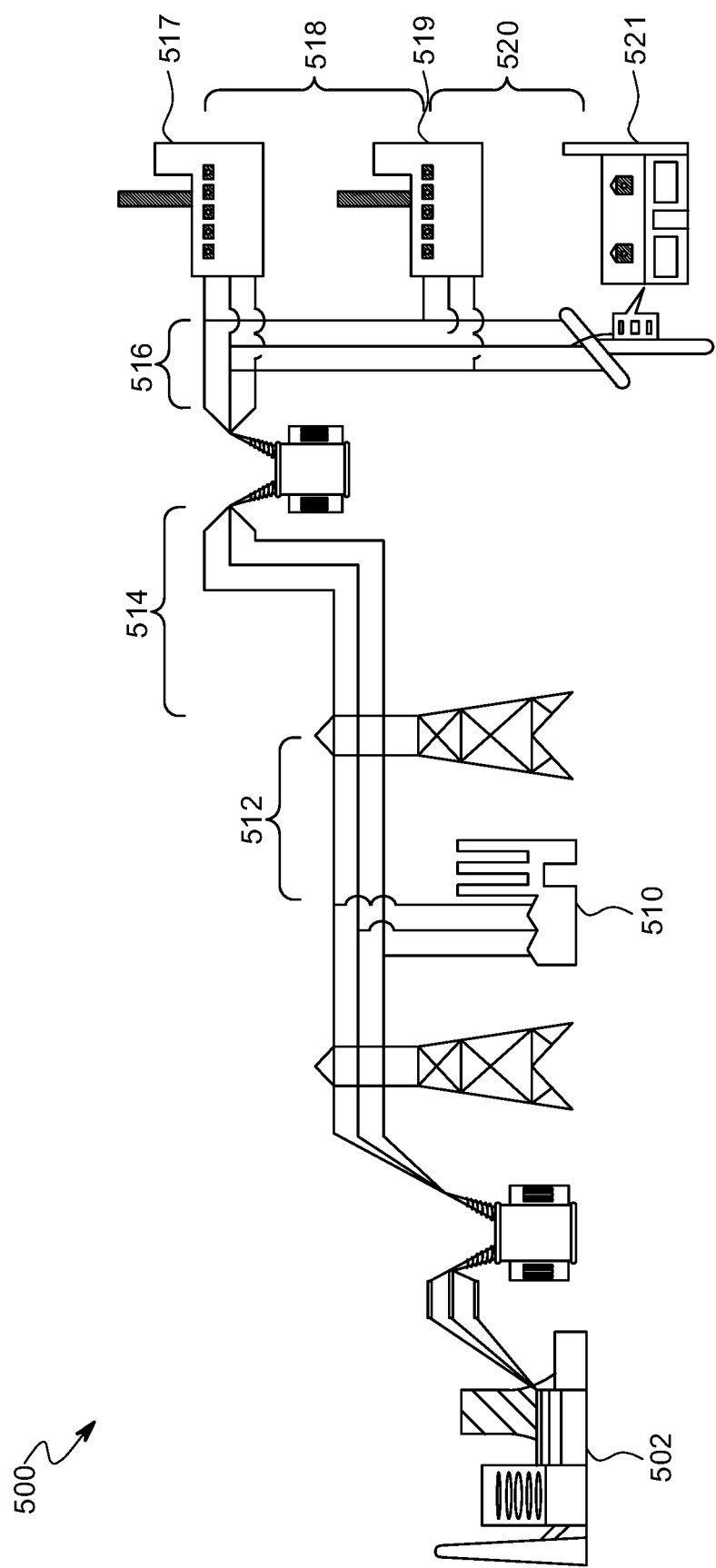
FIG. 5 shows an example network after a two-stage process for network optimization according to certain implementations.

FIG. 5 shows a power grid 500 similar to the power grid 300 of FIG. 3, but with different values assigned to some of the power lines. The power grid 500 includes a generating station 502; a transmission station 510; transmission lines 512 and 514; distribution lines 516, 518, and 520; and consumers 517, 519, and 521. Lines 512, 514, 516, 518, and 520 have each been assigned a load (Amperes) and a value (e.g., cents per kilowatt) that optimizes a first objective function and a second objective function. For example, the currents and values may have been determined by the process 400 of FIG. 4. In particular, the currents and values in FIG. 5 may result from applying the second optimization process of step 416 to the currents and values assigned in FIG. 3. Transmission lines 512 and 514 have each been assigned a value of $0.03/kW rather than the $0.06/kW and $0/kW which were assigned to transmission lines 312 and 314 of FIG. 3, respectively. Such a reassignment of values results in more uniform assignments of value, while preserving optimality with respect to the objective function used to set the values in FIG. 3.

Figure 6:
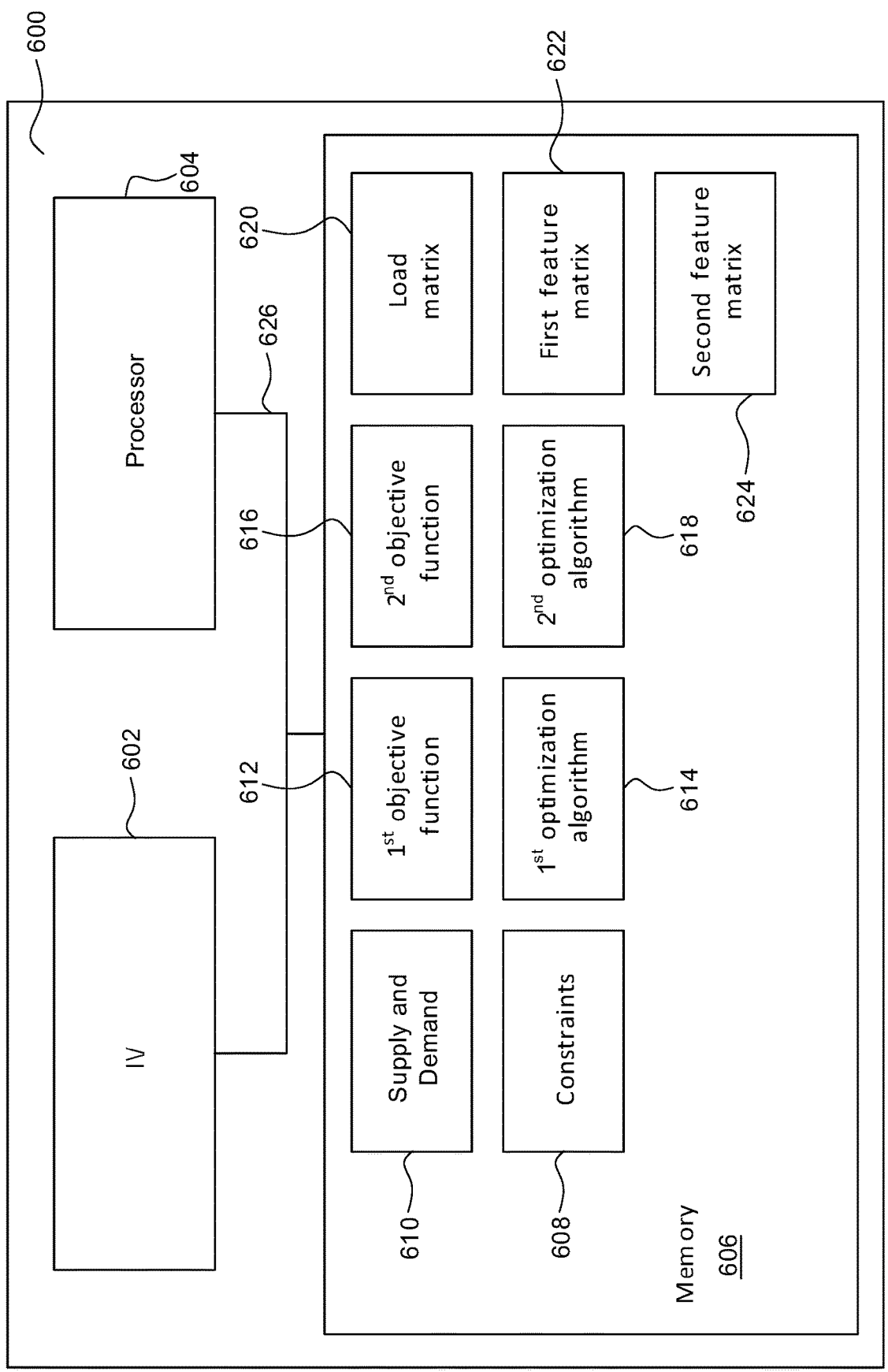
FIG. 6 shows a system for performing network optimization according to certain implementations.

FIG. 6 shows an illustrative system 600 for performing network optimization according to certain implementations. The system 600 may be used by the transmission substation 110 in FIG. 1, generating station 102 in FIG. 1, power consumers 117, 119, or 121 in FIG. 1, or any other suitable entity. The system 600 includes an input/output device 602, a processor 604, memory 606, and a bus wire 626. The bus wire 626 interconnects the input/output device 602, the processor 604, and the memory 606. The memory 606 stores supply and demand data 610, constraints 608, a first objective function 612, a first optimization algorithm 614, a second objective function 616, a second optimization algorithm 618, a load matrix 620, a first feature matrix 622, and a second feature matrix 624. The input/output device 602 receives user input and data from connected computers or computer networks (not shown). The supply and demand data 610, the constraints 608, the first objective function 612, the first optimization algorithm 614, the second objective function 616, and the second optimization algorithm 618 may be received through the input/output device 602. In some implementations, the input/output device 602 includes a user interface. In some implementations, the input/output device 602 includes a network interface for receiving information about energy usage, supply, and demand. In certain implementations, the input/output device 602 includes a sensor interface for receiving information from ammeters, power meters, and/or any other suitable sensor. The processor 604 can access routines stored in the memory 606 to perform optimization processes, such as the optimization process of FIG. 4. In particular, the processor 604 can execute the routines encoded in the first optimization algorithm 614 and the second optimization algorithm 618 to generate the load matrix 620, the first feature matrix 622, and the second feature matrix 624.

Figure 7:
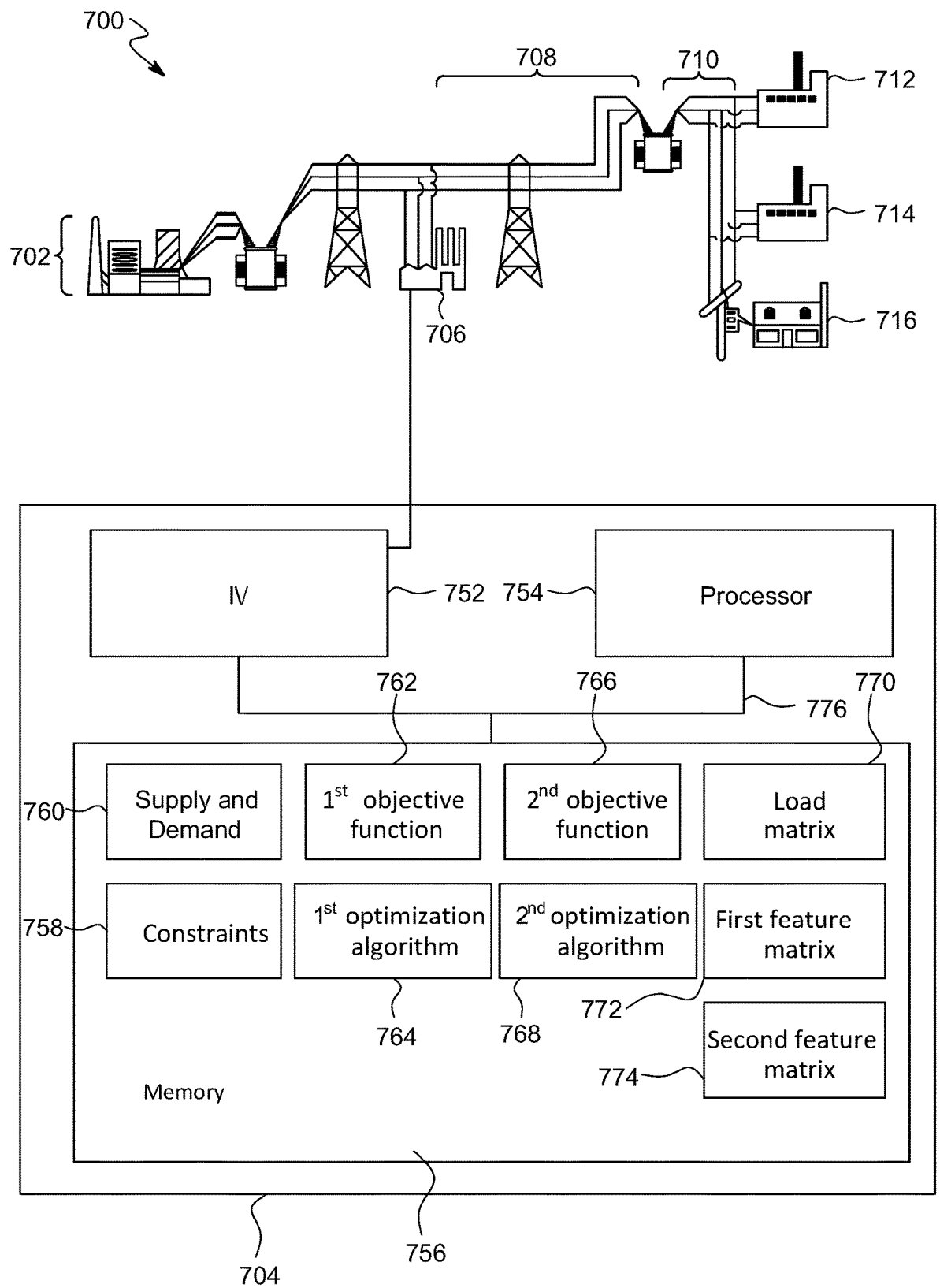
FIG. 7 shows a system for performing network optimization coupled to the network being optimized according to certain implementations.

FIG. 7 shows a system 700 for performing network optimization according to certain implementations. The system 700 includes a power grid section 702, an optimization device 704, a transmission substation 706, a transmission system 708, and a distribution system 710. The system 700 facilitates delivery of power to consumers 712, 714, and 716. The optimization device 704 includes an input/output device 752, a processor 754, memory 756, and a bus wire 776. The bus wire 776 interconnects the input/output device 752, the processor 754, and the memory 756. The memory 756 stores supply and demand data 760, constraints 758, a first objective function 777, a first optimization algorithm 764, a second objective function 766, a second optimization algorithm 768, a load matrix 770, a first feature matrix 772, and a second feature matrix 774. The input/output device 752 receives user input and data from connected computers or computer networks (not shown). The supply and demand data 760, the constraints 758, the first objective function 762, the first optimization algorithm 764, the second objective function 766, and the second optimization algorithm 768 may be received through the input/output device 752. In some implementations, the input/output device 752 includes a user interface. In some implementations, the input/output device 752 includes a network interface for receiving information about energy usage, supply, and demand. In certain implementations, the input/output device 752 includes a sensor interface for receiving information from ammeters, power meters, and/or any other suitable sensor. The processor 754 can access routines stored in the memory 756 to perform optimization processes, such as the optimization process of FIG. 4. In particular, the processor 754 can execute the routines encoded in the first optimization algorithm 764 and the second optimization algorithm 768 to generate the load matrix 770, the first feature matrix 772, and the second feature matrix 774.

The transmission substation 706 is coupled to the optimization device 704 and uses the optimization device 704 to determine how to optimally deliver power from a point of injection (POI) to a point of withdrawal (POW), such as power consumers 712, 714, and 716. The transmission substation 706 uses optimization results to set fees charged to consumers (e.g., power consumers 712, 714, and 716), to allocate revenue to power sources (e.g., generating stations), and/or to allocate power to various parts of the transmission system 708 or the distribution system 710. The optimization device 704 may issue control signals (e.g., for power transmission, power distribution, and/or billing) via the input/output device 752. In some implementations the system 700 includes ammeters and/or power meters that determine the amount of current drawn through different parts of the transmission system 708 or the distribution system 710.

Although FIGS. 6 and 7 graphically depict the components of the optimization system 600 and optimization device 704, respectively, as functional block elements, it will be apparent to one of ordinary skill in the art that these elements can be realized as computer programs or portions of computer programs that are capable of running on a data processor platform to thereby configure the data processor 604 as a system according to the invention.

The depicted components 602, 604, 606, 626, 752, 754, 776, and 756 can be implemented using conventional data processing platforms such as an IBM PC-compatible computer running the Windows operating systems, or a workstation running a LINUX operating system. Alternatively, the systems can comprise dedicated processing systems that include embedded programmable data processing systems.

The optimization system 600 and optimization device 704 can also be realized as software components operating on a conventional data processing system such as a UNIX workstation. In that embodiment, the system 600 and optimization device 704 can be implemented as C language computer programs, or computer programs written in any high level language including C++, FORTRAN, Java or BASIC. Additionally, in an embodiment where microcontrollers or DSPs are employed, the system 600 and optimization device 704 can be realized as computer programs written in microcode or written in a high level language and compiled down to microcode that can be executed on the platform employed.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, symbols, and chips that may be referenced throughout the above description may be represented by voltages, currents, electromagnetic waves, magnetic fields or particles, optical fields or particles, or any combination thereof.

Some implementations include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Figure 8:
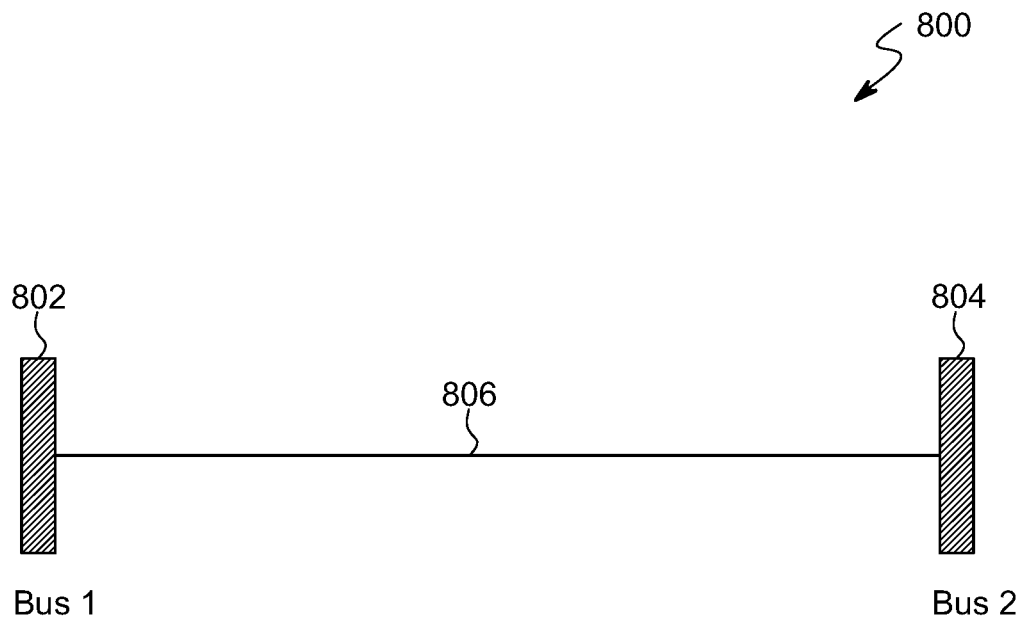
FIG. 8 shows an example power grid 800 subject to a multi-period transmission congestion contract (TCC).

Although some of the foregoing examples relate to energy markets, the systems and methods disclosed herein are also applicable to energy derivative markets, including multi-period transmission congestion contract auctions. FIG. 8 shows a very simple example power grid 800 as an illustration for which a transmission congestion contract (TCC) exists. The power grid 800 includes a first bus 802 ("Bus 1"), a second bus 804 ("Bus 2"), and a branch 806. The branch 806 connects Bus 1 to Bus 2. The branch 806 has a line rating of 75 MW. The swing bus provides a reference for other bus angles.

The TCC for the power grid 800 is a multi-period TCC which is awarded by an auction. Multi-period TCC auctions involve optimization processes that allow market participants to obtain a uniform megawatt (MW) values (e.g., prices) across pre-defined time periods for a single TCC bid. A multi-period TCC bid's dollar per megawatt ($/MW) clearing value is the sum of the component values in each period.

The periods of the multi-period TCC are general and can correspond to successive months or years, different times of use (TOU), time slots occurring for the applications of planned outages over an auction's life cycle, any combinations of the foregoing, or any other suitable time periods. In the example of FIG. 8, an identical network model is used to model the network in each period. However, in some implementations, separate network models, lists of outages, contingency lists, and the like, can be assigned to the periods.

As in singe-period auctions, multi-period auctions involve optimizing the value of an objective function. The multi-period auction clearing values are functions of (i) the shadow values of functional constraints in the binding set, and (ii) bid values of those TCCs on the margin at the auction solution. The shadow value is the rate of change of objective function per unit change of constraint. Expressed mathematically, the shadow value, $SP_j$ is $$SP_j = \frac{\partial O}{\partial b_j}$$

where O is the objective function, and $b_j$ is the $j^{th}$ functional constraint. TCC values, power injection values, power withdrawal values, and bus values are functions of the shadow values of functional constraints. Power (e.g., megawatts) is awarded to TCCs in accordance with how the auction is cleared.

The simple example of FIG. 8 illustrates value indeterminacy. In this example, (i) identical periods are defined; (ii) all bids are specified for all periods; (iii) all binding functional constraints occur within a single period (e.g., the first period); and corresponding constraints in other periods are fully loaded but have no shadow value (termed "nonbinding but fully loaded constraints" or "NBFL constraints"). Although real-world auctions are rarely this simple, NBFL constraints still occur quite frequently in real-world systems.

The following method is used to address value indeterminacy in the power grid 800. After a conventional multi-period auction is performed (including a first optimization), a second optimization is performed. The decision variables of the second optimization are the values of the shadow values of the NBFL constraints from the first optimization. Since clearing values are functions of shadow values, the objective function for the second optimization is to minimize the sum of the squared differences of each bus (or sink) value and its average value (e.g., across all periods of the multi-period auction). To ensure that the optimality of the first optimization results are preserved (e.g., with respect to the objective function used for the conventional multi-period auction/first optimization), the constraints of the second optimization are the boundaries on the shadow and clearing value values of the first optimization to maintain its optimality.

Expressed mathematically, the second optimization minimizes:

$$\sum_{m=1}^{Periods} \sum_{i=1}^{Buses} (P_{i,m}(\alpha) - \overline{P}_i(\alpha))^2$$

subject to $$SP_j \geq 0, j=1, \text{binding constraints}$$

$$BP_k^- \leq CP_k(\underline{\alpha}) \leq BP_k^+, k=1, \text{TCCs}$$

$$\alpha_l \geq 0, l=1, \text{NBFL constraints}$$

where $\alpha$'s are the shadow values of the NBFL constraints, $\underline{\alpha}$ is the matrix of those shadow values, $P_{i,m}$ is the clearing value of the $i^{th}$ bus in period m, $\overline{P}_i$ is the average clearing value of the $i^{th}$ bus across all periods, $SP_j$ is the shadow value of the $j^{th}$ constraint, $BP_k^-$ is the lower boundary value, $BP_k^+$ is the upper boundary value, $CP_k$ is the clearing value of the $k^{th}$ TCC in the first optimization, and $\alpha_l$ is the shadow value of the $l^{th}$ NBFL constraint.

The second objective function can be used for various other purposes besides minimizing value variation. In certain implementations, the second objective function can maximize or minimize TCC auction revenue. For example, the second objective function may be $$\sum_{i=1}^{N\,TCCs} TCC_i \times CP_i$$

where N TCCs is the number of TCCs, $TCC_i$ is the amount of rights awarded to the $i^{th}$ TCC, and $CP_i$ is the clearing value of the $i^{th}$ TCC. The clearing values are functions of the NBFL shadow values.

In some implementations, the second objective function can minimize payments to TCC market participants providing counter flow. The second objective function may be $$\text{Max} \sum_{i=1}^{N\,TCC\,CF} TCC_i \times CP_i$$

where N TCC CF is the number of counterflow TCCs, $TCC_i$ is the amount of rights awarded to the $i^{th}$ TCC, and $CP_i$ is the clearing values of the $i^{th}$ TCC. The clearing values are functions of the NBFL shadow values. Market participants are paid when the clearing values are negative and such payment is called "counter-flow". Maximizing the clearing values for counter-flow TCCs, reduces the cost of such counter-flow.

In certain implementations, the second objective function can maximize or minimize payments to market participants generating MW in an energy market. In such implementations, the second objective is $$\sum_{i=1}^{NGen} MW_i \times LMP_i$$

where NGen is the number of power generators, $MW_i$ is the amount of power supplied (in megawatts) from the $i^{th}$ generator, and $LMP_i$ is the locational based marginal value of the power from the $i^{th}$ generator. Locational based marginal values are functions of the NBFL shadow values.

In some implementations, the second objective function can minimize the amount consumers are paying in an energy market. In such implementations, the second objective function is $$\text{Min} \sum_{i=1}^{N\,Consumers} MW_i \times LMP_i$$

where NConsumers is the number of consumers, $MW_i$ is the amount of power consumed (in megawatts) by the $i^{th}$ consumer, and $LMP_i$ is the locational based marginal value of the power consumed by the $i^{th}$ consumer. Locational based marginal values are functions of the NBFL shadow values.

In certain implementations, the second objective function can minimize the amount virtual bidders are being paid in a day-ahead market. In such implementation, the second objective function is $$\text{Min} \sum_{i=1}^{N\,Virtual} MW_i \times LMP_i$$

where NVirtual is the number of virtual bidders, $MW_i$ is the amount of power bought or sold (in megawatts) by the $i^{th}$ virtual bidder, and $LMP_i$ is the locational based marginal value of the power bought or sold by the $i^{th}$ virtual bidder. Locational based marginal values are functions of the NBFL shadow values. Minimizing the revenue of virtual bidder may be desirable because virtual bidders have no power to supply. Rather they attempt to arbitrage value differences between the day-ahead and real-time markets.

In some implementations, the second objective function can minimize the congestion rent in a day-ahead market. Congestion rent is the difference between what consumers are paying and what suppliers (generators) are being paid in the day-ahead market. Minimizing congestion rent may be desirable because a market participant in a TCC auction receives a portion of the congestion rent. In such implementations, the second objective function is $$\text{Min} \left( \sum_{i=1}^{N\,Consumers} MW_i \times LMP_i - \sum_{j=1}^{NGen} MW_j \times LMP_j \right)$$

where NConsumers is the number of consumers, $MW_i$ is the amount of power consumed (in megawatts) by the $i^{th}$ consumer, and $LMP_i$ is the locational based marginal value of the power consumed by the $i^{th}$ consumer, NGen is the number of power generators, $MW_j$ is the amount of power supplied (in megawatts) from the $j^{th}$ generator, and $LMP_j$ is the locational based marginal value of the power from the $j^{th}$ generator. Locational based marginal values are functions of the NBFL shadow values.

The second optimization has no impact on (i) the value of the objective function used for the first optimization or (ii) the MW or TCCs awarded by the first optimization. The first optimization's marginal set is not changed by the second optimization. The results of the second optimization do not change the flows on the transmission grid since it does not change the MW or TCC awards. The second optimization can change the locational based marginal values or clearing values determined by the first optimization. But the clearing values determined by the first optimization were somewhat arbitrary anyway since they depended upon the solution path used by the first optimization.

A numerical example may further illustrate the functioning of the second optimization. In example of FIG. 8, a multi-period TCC auction is conducted for the power grid 800 over two periods and with two bids. The two bids are:

Bid 1: Bus 1 to Bus 2 for 10 MW at $80/MW for period 1 only.

Bid 2: Bus 1 to Bus 2 for 80 MW at $120/MW for periods 1 and 2.

The second objective function in the example of FIG. 8 is the weighted least squares difference in Bus 2's value across the two periods.

After the first optimization process is performed:

Bid 1 is awarded 0 MW at a clearing value of $120/MW.
Bid 2 is awarded 75 MW at a clearing value of $120/MW.
The branch flows in both periods 1 and 2 are fully loaded.
Bus 2's values are −$120/MW in period 1 and $0/MW in period 2.
The weighted least square difference (WLS)=7,200.

Thus, there is high value variation in the clearing values after the first optimization.

The second optimization is performed to minimize the second objective function, the WLS difference of bus 2's values with respect to bus 2's average value across the two periods, while preserving the optimality of the results of the first optimization. After this second optimization, Bid 1's award remains 0 MW and Bid 2's award remains 75 MW.

The flows and the first objective function value do not change.

Bid 1's clearing value is now $80/MW and Bid 2's clearing value remains $120/MW.

Bus 2's values are now −$80/MW in period 1 and −$40/MW in period 2.

The WLS=800.

Thus, the second optimization greatly reduced value variation.

The second objective function can be any of a variety of functions beside WLS. The second objective function may be any function of NBFL shadow value values. In some implementations, the second objective function is auction revenue so that the auction revenue can be minimized or maximized. In certain implementations, the second objective function is the sum of clearing values so that the sum of clearing values can be minimized or maximized. In some implementations, ranges on individual clearing value are set in the second optimization.

The first optimization's flow constraints do not necessarily have to be fully loaded for their shadow values to be included in the second objective function. Similar to what is done in energy markets, the solution to the optimization can selectively "bind on" other flow constraints by including those other flow constraints into the NBFL list. Furthermore, the methods disclosed herein can be used in any type of market whenever clearing values are used for settlement. For example, the methods disclosed herein can be used to minimize the amount of congestion rent or the amount that generation will be paid in the day-ahead-market (DAM).

The foregoing is merely illustrative of the principles of the disclosure, and the systems, devices, and methods can be practiced by other than the described embodiments, which are presented for purposes of illustration and not of limitation. It is to be understood that the systems, devices, and methods disclosed herein, while shown for use in electrical energy markets, may be applied to systems, devices, and methods to be used in other networks.

Variations and modifications will occur to those of skill in the art after reviewing this disclosure. The disclosed features may be implemented, in any combination and subcombination (including multiple dependent combinations and sub-combinations), with one or more other features described herein. The various features described or illustrated above, including any components thereof, may be combined or integrated in other systems. For example, although the disclosure discusses two optimization processes, in some implementations the first optimization process and the second optimization process may be combined into a single process. Moreover, certain features may be omitted or not implemented.

While operations are depicted in the drawings (e.g., FIG. 4) in a particular order, this should not be understood as requiring that such operations be performed in the particular order shown or in sequential order, or that all illustrated operations be performed, to achieve desirable results. Additionally, the different examples described are not singular examples and features from one example may be included within the other disclosed examples. Accordingly, it will be understood that the claims are not to be limited to the examples disclosed herein, but is to be understood from the technical teachings provided above, as those teachings will inform the person of skill in the art.

Examples of changes, substitutions, and alterations are ascertainable by one skilled in the art and could be made without departing from the scope of the information disclosed herein. All references cited herein are incorporated by reference in their entirety and made part of this application.

We claim:

1. A method for optimally delivering electrical energy comprising:

receiving a first objective function and a second objective function for optimizing delivery of an energy resource over a power grid;

receiving a set of constraints representing electrical load capacities of a plurality of elements of the power grid;

executing a first optimization process, using the set of constraints and the first objective function, to identify (i) a load matrix embodying a set of optimal electrical loads for each of the plurality of elements of the power grid and (ii) a first feature matrix representing values corresponding to the optimal electrical loads, wherein the load matrix and first feature matrix optimize the first objective function and satisfy the set of constraints;

determining that one or more of the elements of the plurality of elements is fully loaded when the optimal load of the respective one or more elements is equal to the electrical load capacity of the respective one or more elements;

determining that one or more of the elements of the plurality of elements is non-binding when the value corresponding to the respective one or more elements is zero; and in response to determining that the load matrix includes an element that is both non-binding and fully loaded:

performing a second optimization process, using the first feature matrix and the second objective function as inputs, to identify a second feature matrix which optimizes the second objective function, wherein the second feature matrix preserves the optimality of the first objective function and satisfies the set of constraints, and wherein the second feature matrix assigns a non-zero value to the element that was determined to be non-binding and fully-loaded; and transmitting the first load matrix and the second feature matrix to the least one power generator to instruct the at least one power generator to generate electrical power.

2. The method of claim 1, wherein the elements of the power grid include at least one of an electrical conduit and a power generator.

3. The method of claim 2, wherein the electrical load capacity is a maximum current which the electrical conduit can transmit without exceeding 100° C.

4. The method of claim 3, wherein the electrical load capacity is determined by at least one of IEEE Standard 738, CIGRE TB 207, and EPRI Dynamp.

5. The method of claim 1, wherein the second objective function is a function of shadow values of non-binding fully loaded constraints of the power grid.

6. The method of claim 1, wherein the second objective function is a measure of disparity in values of the energy resources.

7. The method of claim 6, wherein the second objective function is based on a sum of squares of differences between an average and each value in the second feature matrix.

8. The method of claim 7, wherein the second objective function is $$\sum_{m=1}^{Periods} \sum_{i=1}^{Buses} (P_{i,m}(\underline{\alpha}) - \overline{P}_i(\underline{\alpha}))^2$$

where α's are shadow values of non-binding fully loaded (NBFL) constraints, $\underline{\alpha}$ is a matrix of the α's, $P_{i,m}$ is a clearing value of an $i^{th}$ bus in a period m, $\overline{P}_i$ is the average clearing value of the $i^{th}$ bus across all periods.

9. The method of claim 1, wherein the second objective function is $$\sum_{i=1}^{N\,TCCs} TCC_i \times CP_i$$

where N Transmission Congestion Contracts (TCCs) is a number of TCCs, $TCC_i$ is energy awarded by the $i^{th}$ TCC, and $CP_i$ is a clearing value of the energy awarded to the $i^{th}$ TCC.

10. The method of claim 1, wherein the second objective function is $$\sum_{i=1}^{N\,TCC\,CF} TCC_i \times CP_i$$

where N TCC CF is a number of counterflow TCCs, $TCC_i$ is energy awarded by the $i^{th}$ TCC, and $CP_i$ is a clearing value of the energy awarded to the $i^{th}$ TCC.

11. The method of claim 1, wherein the second objective function is $$\sum_{i=1}^{NGen} MW_i \times LMP_i$$

where NGen is a number of power generators, $MW_i$ is the amount of power supplied from the $i^{th}$ generator, and $LMP_i$ is a locational based marginal value of the power from the $i^{th}$ generator.

12. The method of claim 1, wherein the second objective function is $$\sum_{i=1}^{N\,Consumers} MW_i \times LMP_i$$

where NConsumers is a number of consumers, $MW_i$ is an amount of power consumed by the $i^{th}$ consumer, and $LMP_i$ is a locational based marginal value of power consumed by the $i^{th}$ consumer.

13. The method of claim 1, wherein the second objective function is $$\sum_{i=1}^{N\,Virtual} MW_i \times LMP_i$$

where NVirtual is a number of virtual bidders, $MW_i$ is an amount of power bought or sold by the $i^{th}$ virtual bidder, and $LMP_i$ is a locational based marginal value of the power bought or sold by the $i^{th}$ virtual bidder.

14. The method of claim 1, wherein the second objective function is $$\left( \sum_{i=1}^{N\,Consumers} MW_i \times LMP_i - \sum_{j=1}^{NGen} MW_j \times LMP_j \right)$$

where NConsumers is a number of consumers, $MW_i$ is an amount of power consumed by the $i^{th}$ consumer, and $LMP_i$ is the locational based marginal value of the power consumed by the $i^{th}$ consumer, NGen is the number of power generators, $MW_j$ is the amount of power supplied from the $j^{th}$ generator, and $LMP_j$ is a locational based marginal value of the power from the $j^{th}$ generator.

15. The method of claim 1, wherein the second optimization process receives optimality-preserving value ranges from the first optimization process.

16. The method of claim 1, wherein the second optimization is performed using at least one of linear programming and quadratic programming.

17. The method of claim 1 wherein the second optimization is performed using interior-point methods.

18. The method of claim 1, wherein the second optimization is performed using at least one of an ellipsoid algorithm, a Karmarkar's projective algorithm, affine scaling, barrier function algorithm, and a path-following algorithm.

19. The method of claim 1, wherein the second optimization is performed using at least one of a Lagrangian multiplier, an active set algorithm, an augmented Lagrangian algorithm, a conjugate gradient algorithm, and a gradient projection algorithm.

20. The method of claim 1, wherein the energy resource is at least one of electrical energy and an electrical energy derivative.

21. The method of claim 1, wherein optimizing the first objective function includes one of minimizing the second objective function and maximizing the first objective function.

22. The method of claim 1, wherein optimizing the second objective function includes one of minimizing the second objective function and maximizing the second objective function.

23. A system for delivering an energy resource, the system comprising:
a user interface configured to receive:
a first objective function for optimizing distribution of an energy resource,
a set of constraints including a representation of electrical load capacities of a plurality of elements of a power grid, and
a second objective function for assigning value to the energy resource, a processor configured to execute optimization processes; and
non-transitory, computer-readable memory storing instructions which, when executed by the processor, cause the processor to:
identify, using the set of constraints and the first objective function, both:
(i) a load matrix embodying a delivery of the energy resource over the power grid, and
(ii) a first feature matrix representing values corresponding to the load matrix, each of which optimize the first objective function while satisfying the set of constraints;
determine whether the load matrix indicates that at least one element of the plurality of elements is fully loaded;
determine whether the first feature matrix includes a zero-value corresponding to a fully loaded element; and
in response to determining that the first feature matrix includes a zero-value corresponding to a fully loaded element, identify, using the first feature matrix and the second objective function, a second feature matrix which optimizes the second objective function and which represents values corresponding to the load matrix, the second feature matrix preserving the optimization of the first objective function and satisfying the set of constraints, wherein the second feature matrix is not equal to the first feature matrix,
transmit the load matrix and the second feature matrix to at least one power generator to instruct the at least one power generator to generate electrical power.

24. The system of claim 23, further comprising the power grid.

25. The system of claim 23, wherein the elements of the power grid include at least one of an electrical conduit and a power generator.

26. The system of claim 23, wherein the electrical load capacity is a maximum current which the electrical conduit can transmit without exceeding 100° C.

27. The system of claim 23, wherein the second objective function is a measure of disparity in values of the energy resources.

28. The system of claim 23, wherein the second objective function is $$\sum_{m=1}^{np} \sum_{i=1}^{n} (P_{i,m}(\underline{\alpha}) - \overline{P}_l(\underline{\alpha}))^2$$

where n is a number of network elements in the power grid, np is a number of periods, $P_{i,m}$ is a value of the $i^{th}$ element in the $m^{th}$ period, $\underline{\alpha}$ is a matrix of shadow values of non-binding fully loaded constraints of the power grid, and $\overline{P}_l$ is the average value.

29. The system of claim 23, wherein the second optimization is performed using interior-point methods.

30. The system of claim 23, wherein the energy resource is at least one of electrical energy and an electrical energy derivative.

31. A system for delivering an energy resource, the system comprising:
a processor configured to:
receive a first objective function and a second objective function for optimizing delivery of an energy resource over a power grid;
receive a set of constraints representing electrical load capacities of a plurality of elements of the power grid;
execute a first optimization process, using the set of constraints and the first objective function, to identify (i) a load matrix embodying a set of optimal electrical loads for each of the plurality of elements of the power grid and (ii) a first feature matrix representing values corresponding to the optimal electrical loads, wherein the load matrix and first feature matrix optimize the first objective function and satisfy the set of constraints;
determine that one or more of the elements of the plurality of elements is fully loaded when the optimal load of the respective one or more elements is equal to the electrical load capacity of the respective one or more elements;
determine that one or more of the elements of the plurality of elements is non-binding when the value corresponding to the respective one or more elements is zero; and
in response to determining that the load matrix does not include an element that is both non-binding and fully loaded:
transmit the first load matrix and the first feature matrix to at least one power generator to instruct the at least one power generator to generate electrical power; and
in response to determining that the load matrix includes an element that is both non-binding and fully loaded:
perform a second optimization process, using the first feature matrix and the second objective function as inputs, to identify a second feature matrix which optimizes the second objective function, wherein the second feature matrix preserves the optimality of the first objective function and satisfies the set of constraints, and wherein the second feature matrix assigns a non-zero value to the element that was determined to be non-binding and fully-loaded; and
transmit the first load matrix and the second feature matrix to the least one power generator to instruct the at least one power generator to generate electrical power.

* * * * *